(No Model.)
C. FEIGENSPAN.
PROCESS OF MANUFACTURING BEER.
No. 475,853. Patented May 31, 1892.
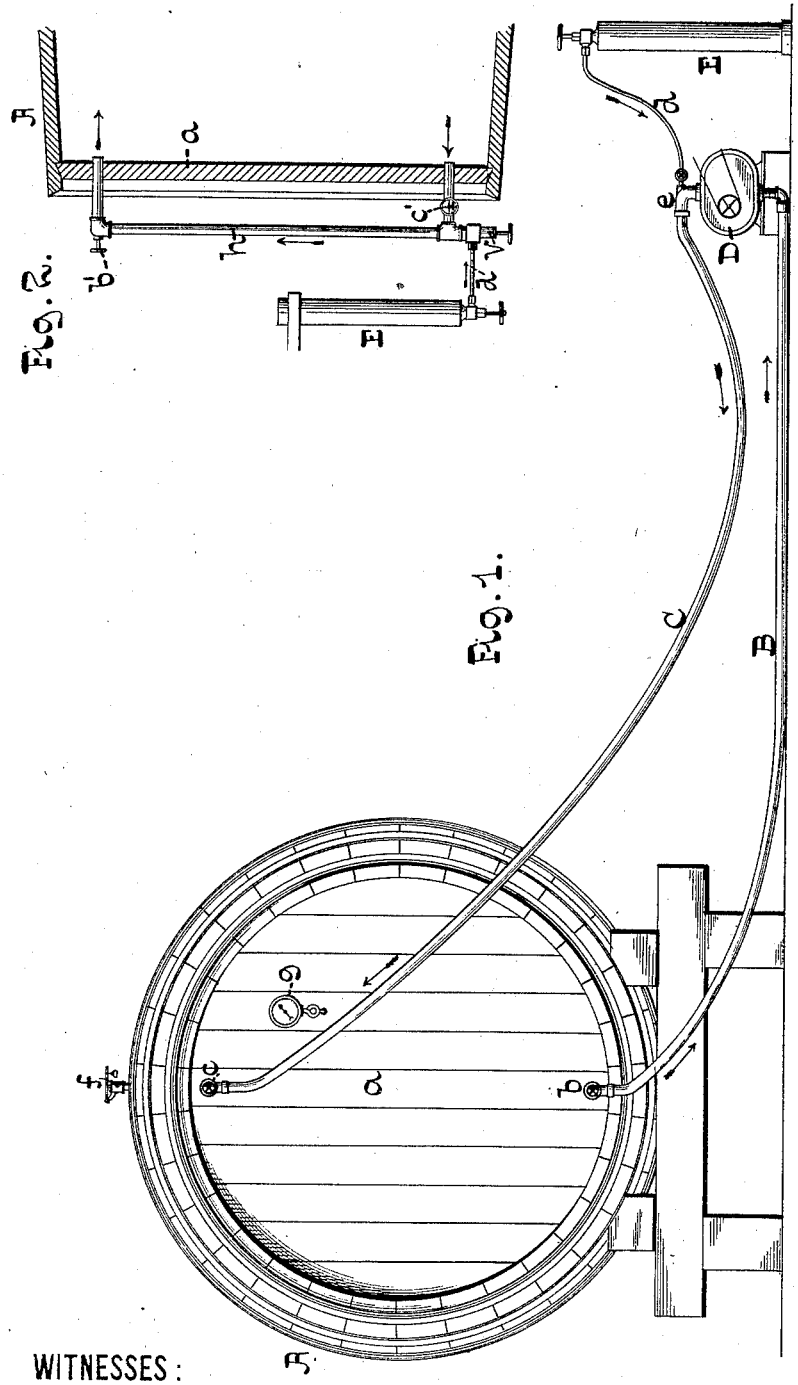
WITNESSES:
A. Faber du Faur.
Harry E. Browne.
INVENTOR:
Christian Feigenspan
BY A Faber du Faur jr.
ATTORNEY

UNITED STATES PATENT OFFICE.

CHRISTIAN FEIGENSPAN, OF NEWARK, NEW JERSEY, ASSIGNOR TO THE UNIVERSAL CARBONATING COMPANY, OF SAME PLACE.

PROCESS OF MANUFACTURING BEER.

SPECIFICATION forming part of Letters Patent No. 475,853, dated May 31, 1892.

Application filed August 29, 1891. Serial No. 404,121. (No specimens.)

*To all whom it may concern:*

Be it known that I, CHRISTIAN FEIGENSPAN, a citizen of the United States, and a resident of Newark, in the county of Essex and State of New Jersey, have invented certain new and useful Improvements in Processes of Manufacturing Beer, of which the following is a specification.

Beer as heretofore prepared passes through a first fermentation in open vessels. It is then drawn off from the yeast into large casks (ruh-casks) nearly closed, where it remains for a longer time, and is then generally called "ruh-beer." This ruh-beer is then pumped into shaving-casks and mixed with young beer, (kraeusen,) whereby fermentation is again started, the cask at first remaining open. Toward the end of this secondary fermentation or, as it is called, the "kraeusen stage" when the beer is clear, the cask is bunged up tight for a few days to confine the carbonic acid in the beer. Within the last few years the saturation of the beer with carbonic acid during the kraeusen stage has been assisted and controlled by the introduction of carbonic acid. By adding kraeusen to ruh-beer and passing it through a second fermentation the beer must naturally, to a certain degree, have the properties of new beer.

The object of my invention is to dispense altogether with the addition of kraeusen and with the final fermentation, so as to produce a superior quality of beer, and for this purpose I introduce carbonic acid into the ruh-beer in a closed cask, establishing at the same time circulation of the beer, so as to completely saturate every part of it to the desired degree.

In carrying out my process I use by preference apparatus such as shown in the annexed drawings, in which—

Figure 1 represents a front view of a ruh-cask with means for establishing circulation and for supplying carbonic acid. Fig. 2 represents a partial longitudinal section of a ruh-cask and modified means for establishing circulation and for supplying carbonic acid.

Similar letters indicate corresponding parts.

Referring now to Fig. 1, A represents a ruh-cask, or any cask containing ruh-beer to be treated. *a* is one of the heads of the cask. Into proper holes, near the bottom and top of the head *a*, angle-valves *b* and *c* are screwed or otherwise attached, so as to establish communication with the inside of the cask. D is a pump of any suitable construction, the inlet of which is connected by a hose B with the lower angle-valve *b*, while the discharge is connected by a hose C with the upper angle-valve *c*, so that circulation may be established in the direction of the arrows and through the cask. E is a carbonic-acid cylinder, from which a small pipe *d* leads to a nozzle, which passes into the elbow *e*, so that carbonic acid may be discharged from the cylinder E into the hose. A safety-valve *f* is placed on the top of the barrel, and a gage *g* serves to show the pressure in the cask.

When it is desired to prepare beer for the market, the proper connections just described are made. The cask, pump, and hose are completely filled with beer, the bung-hole closed, the circulating-pump set in motion, and carbonic acid admitted into the elbow *e*. In two hours or less the beer is generally completely saturated with carbonic acid and the gage indicates from ten to twelve pounds pressure. The valves *b* and *c* are now closed and the beer allowed to rest for a few days before it is drawn off into the kegs either directly or by first passing it through a filter. The fermentation of the beer should be so regulated as not to consume all the sugar; and in some cases, to make the beer more palatable, I add fresh unfermented wort or other equivalent extracts to the ruh-beer before saturating it with carbonic acid, and sometimes I also add antiseptics and also suitable flavor.

In the arrangement shown in Fig. 1 the carbonic acid is taken from the top of the cylinder E. I have found, however, that even better results are obtained by reversing the position of the cylinder E and taking the acid from the bottom, as shown in Fig. 2, whereby more or less liquid carbonic acid is supplied to the circulating beer, causing a more rapid absorption of the carbonic acid.

For one barrel of beer I use about one-fourth pound of carbonic acid and sometimes I add about ten per cent. of fresh wort or its equivalent.

In Fig. 2 I have shown an arrangement for producing circulation by means of a carbonic-acid jet without the use of a separate pump. In this figure, A indicates the cask; $a$, the front end of the same; $h$, a pipe connecting with the interior of the cask near the top and bottom and provided with stop-valves $b'$ and $c'$. E is the carbonic-acid cylinder placed with the discharge-opening down; $d$, a pipe leading from the cylinder E to the needle-valve V, through which carbonic acid from the bottom of the cylinder is injected into the pipe $h$ in an upward direction, thereby establishing circulation from the bottom of the cask through the pipe $h$ to the top of the cask, back to the bottom, and so on.

While I prefer to use the liquid carbonic acid from the bottom of the cylinder E, gaseous carbonic acid from the top of the cylinder or from any suitable source may be used.

I do not confine myself to any specific construction of the apparatus for carrying out my process nor to any specific direction of the circulation of the beer within the cask.

What I claim as my invention is—

The within-described method of preparing ruh-beer for the market, which consists in confining the beer in a closed cask filled substantially to its capacity, causing repeated forced external circulation of the whole of the contents from and to the cask, and injecting carbonic acid into the external current, substantially as described.

In testimony that I claim the foregoing as my invention I have signed my name, in presence of two witnesses, this 25th day of August, 1891.

CHRISTIAN FEIGENSPAN.

Witnesses:
A. FABER DU FAUR,
HARRY E. BROWNE.